T. A. WILLARD.
STORAGE BATTERY.
APPLICATION FILED APR. 29, 1915.
1,151,077.
Patented Aug. 24, 1915.
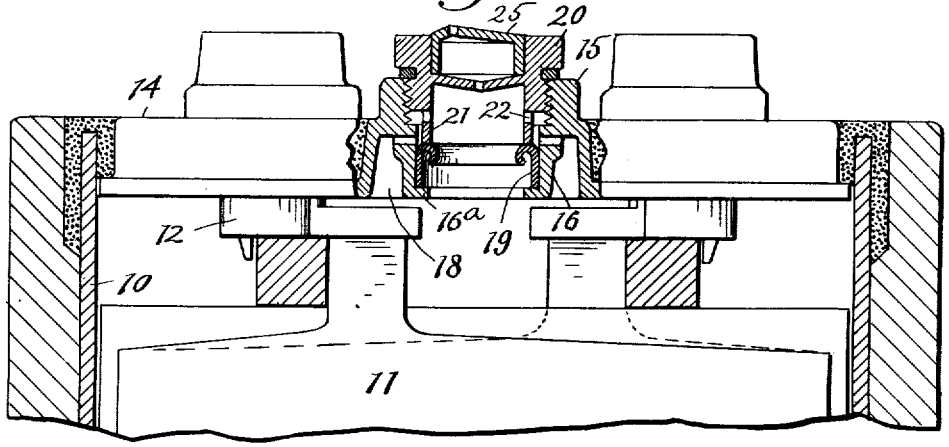
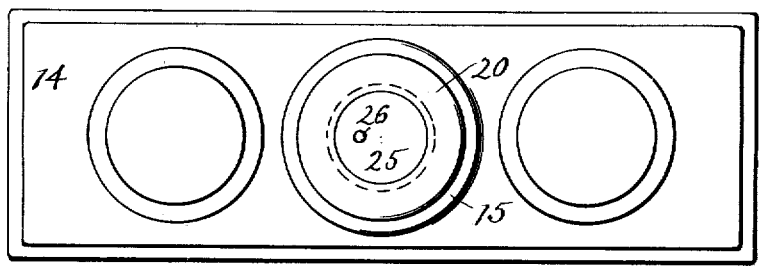
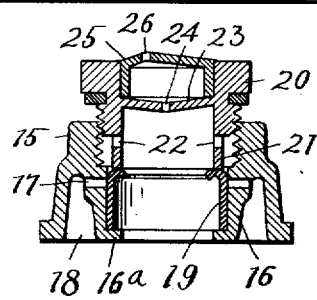
Witnesses
E. B. Gilchrist
L. I. Porter
Inventor
Theodore A. Willard
by Thurston & Kwis
Attys.

UNITED STATES PATENT OFFICE.

THEODORE A. WILLARD, OF CLEVELAND, OHIO, ASSIGNOR TO THE WILLARD STORAGE BATTERY COMPANY, OF CLEVELAND, OHIO, A CORPORATION OF OHIO.

STORAGE BATTERY.

1,151,077.  Specification of Letters Patent.  Patented Aug. 24, 1915.

Application filed April 29, 1915. Serial No. 24,633.

*To all whom it may concern:*

Be it known that I, THEODORE A. WILLARD, a citizen of the United States, residing at Cleveland, in the county of Cuyahoga and State of Ohio, have invented a certain new and useful Improvement in Storage Batteries, of which the following is a full, clear, and exact description.

This invention relates to storage batteries and has for its object to provide a construction which automatically prevents overfilling of the battery cell or container with battery solution.

The invention may be briefly summarized as consisting in certain novel combinations and arrangements of parts which will be described in the specification and set forth in the appended claims.

In the accompanying sheet of drawings Figure 1 is a sectional view through a storage battery embodying my invention, parts being shown in elevation; Fig. 2 is a top plan view of the same; Fig. 3 is a sectional view through the vent chamber and vent plug showing the plug partly removed.

In the drawings 10 represents the jar or container inclosing the usual battery plates 11 connected together by straps from which the positive and negative terminal posts 12 extend upwardly through the cover which is shown at 14. The cover is provided at some suitable point, and in this case in the center with a vent chamber or condensing chamber, as the same may be termed, this chamber being composed of an upwardly extending interiorly threaded flange 15 and a downwardly extending flange 16, the latter being preferably of less internal diameter than the flange 15, and being provided at its lower end with an inturned flange 16ª.

Heretofore it has been the case that frequently the battery would be overfilled, and considerable care had to be exercised to prevent overfilling. It is desirable that the battery be filled only to a certain height, and in the construction such as herein disclosed to a height corresponding to the lower plane of the cover so as to leave open space for air or vapors or gases evolved from the battery between the lower plane of the cover and the upper plane thereof. With the construction to be described overfilling of the battery is practically impossible, even though little or no care is exercised by the operator in filling the battery.

It will be observed that the flange 16 is provided near the top thereof with slots or vent openings 17, these slots being provided in order that gas or vapor may pass from the open space 18 immediately surrounding the flange 16 to the interior of the vent chamber or condensing chamber. On the interior of the annular flange 16, and seated on the inturned flange 16ª is a soft rubber annulus 19, which before the vent plug is in place extends upwardly above the openings or slots 17 and closes the same. The vent plug which is shown at 20 is adapted to be secured into the interiorly threaded upper part of the chamber, Fig. 1 showing the vent plug in normal position, and Fig. 3 showing the same partly removed. This vent plug is provided at its lower end with a flange 21 which is of less external diameter than the threaded part immediately above the flange, and of less external diameter than the internal diameter of the downward extending flange 16, this flange 21 being provided with vent slots or openings 22. The flange is of such a length, or the rubber annulus 19 extends upwardly to such a point that when the vent plug is screwed downwardly to normal position, the bottom of the flange 21 engages the top of the rubber annulus 19 and forces the same downwardly, either compressing the same or bending the annulus downwardly and inwardly so as to uncover the slots or openings 17, and thus establishing communication from the space 18 to the interior of the vent plug through the openings or slots 17 in the side wall of the vent chamber, and through the openings or slots 22 in the side wall of the vent plug. The vent plug is provided above the openings or slots 22 with a partition 23 having a centrally disposed vent opening 24, and above the partition with a cap 25 having a vent opening 26 which is preferably disposed laterally with respect to the vent openings 24 or out of alinement therewith.

When it is desired to fill the battery either when the battery is first put into use, or when the battery solution is being replenished, the vent plug is removed, permitting the rubber annulus 19 to expand or assume its original shape so as to close and seal the openings or slots 17. Then, when the battery solution is poured into the battery through the vent chamber, and when the solution reaches the lower plane of the cover, air is trapped in the irregular spaces above the lower plane of the cover, preventing the solution from rising above that point or plane. When the solution rises toward the top of the vent chamber, or even if it overflows, no more than the stated amount will enter the interior of the battery due to the fact that the openings 17 are sealed. Then, when the plug is screwed into place, as before stated, the rubber annulus is forced downwardly, uncovering the openings 17 so that the gases or vapors which rise to the top of the battery may pass from the space 18 out through the vent chamber and vent plug.

Having thus described my invention, what I claim is:—

1. In a storage battery, a cover having a chambered wall provided with a vent opening, a vent plug adapted to be fitted to said chambered wall, and means automatically sealing said opening when the vent plug is removed, and uncovering or unsealing said opening when the vent plug is in normal position.

2. In a storage battery, a cover having a chamber provided in its wall with a vent opening, a vent plug removably fitted to the chamber and means in the chamber for sealing said opening when the plug is removed.

3. In a storage battery, a cover having a chamber provided with an opening in the wall thereof, a vent plug removably fitted in the opening, means in said chamber covering the opening and adapted to be shifted by the vent plug so as to uncover said opening when the vent plug is placed in position.

4. In a storage battery, a cover having a chamber provided with a vent opening, a yieldable member in the lower part of the chamber, a vent plug fitted into said chamber and having a portion which engages said yieldable member so as to compress the same, said yieldable member covering said opening when the vent plug is removed and uncovering the opening when the vent plug is placed in normal position.

5. In a storage battery, a cover having a chamber provided in its side wall with a vent opening, a rubber annulus in the lower portion of the chamber, a vent plug adapted to be fitted into said chamber, and having a portion which engages said rubber annulus and forces the same downward when the vent plug is secured in place, said rubber annulus covering said opening when the plug is removed.

6. In a storage battery, a cover having an annular flanged portion provided between the top and bottom thereof with a vent opening, a rubber annulus seated in the lower part of said flanged portion, a vent plug screwed into the top of said flanged portion and having at the bottom thereof an extension provided with a vent opening and adapted to engage and compress said rubber annulus, said rubber annulus sealing said opening in the flanged portion of the cover when the plug is removed, and being compressed by said extension of the vent plug so as to uncover said opening when the plug is in normal position.

In testimony whereof, I hereunto affix my signature in the presence of two witnesses.

THEODORE A. WILLARD.

Witnesses:
L. I. PORTER,
A. J. HUDSON.

DISCLAIMER.

1,151,077.—*Theodore A. Willard*, Cleveland, Ohio. STORAGE BATTERY. Patent dated August 24, 1915. Disclaimer filed November 3. 1915, by the patentee and assignee, *The Willard Storage Battery Company*

Enters this disclaimer—

"To that part of said Letters Patent which is in the following words, to wit:——

"1. In a storage battery, a cover having a chambered wall provided with a vent opening, a vent plug adapted to be fitted to said chambered wall, and means automatically sealing said opening when the vent plug is removed, and uncovering or unsealing said opening when the vent plug is in normal position.

"2. In a storage battery, a cover having a chamber provided in its wall with a vent opening, a vent plug removably fitted to the chamber and means in the chamber for sealing said opening when the plug is removed.

"3. In a storage battery, a cover having a chamber provided with an opening in the wall thereof, a vent plug removably fitted in the opening, means in said chamber covering the opening and adapted to be shifted by the vent plug so as to uncover said opening when the vent plug is placed in position."

[*Official Gazette, November 9, 1915.*]